(12) United States Patent
Trawick

(10) Patent No.: US 12,384,556 B2
(45) Date of Patent: Aug. 12, 2025

(54) HYBRID PROPULSION SYSTEMS WITH POWER SHARING

(71) Applicant: Rolls-Royce Corporation, Indianapolis, IN (US)

(72) Inventor: David Russell Trawick, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 120 days.

(21) Appl. No.: 18/159,506

(22) Filed: Jan. 25, 2023

(65) Prior Publication Data

US 2024/0246690 A1  Jul. 25, 2024

(51) Int. Cl.
*B64D 35/024* (2025.01)
*B64D 35/023* (2025.01)
(Continued)

(52) U.S. Cl.
CPC ......... *B64D 35/024* (2024.01); *B64D 35/023* (2024.01); *F02C 6/00* (2013.01);
(Continued)

(58) Field of Classification Search
CPC .... B64D 35/024; B64D 35/023; B64D 27/33; B64D 35/022; B64D 35/026
See application file for complete search history.

(56) References Cited

U.S. PATENT DOCUMENTS 6,344,700 B1  2/2002  Eisenhauer et al.
9,194,285 B2  11/2015  Botti et al.
(Continued)

FOREIGN PATENT DOCUMENTS

CA       3038299 A1      4/2018
DE  102010021026 A1    11/2011
(Continued)

OTHER PUBLICATIONS

Bradley et al. "Subsonic Ultra Green Aircraft Research: Phase I Final Report," NASA/CR-2011-216847, Apr. 2011, 207 pp.
(Continued)

*Primary Examiner* — Joshua J Michener
*Assistant Examiner* — Cindi M Curry
(74) *Attorney, Agent, or Firm* — Shumaker & Sieffert, P.A.

(57) ABSTRACT

An example aircraft includes a parallel propulsion unit, the parallel propulsion unit comprising: a propulsor configured to provide forward propulsion of the aircraft; a gas turbine engine configured to drive the propulsor; an electrical machine configured to generate, for output via one or more electrical busses, electrical energy using mechanical energy derived from the gas turbine engine; and a power sharing module configured to control a ratio of the mechanical energy used to drive the propulsor and used to generate electrical energy; and a plurality of series propulsion units, each series propulsion unit comprising a respective propulsor of a plurality of propulsors that are configured to provide vertical propulsion of the aircraft and a respective electrical machine of a plurality of electrical machines, each respective electrical machine configured to drive a respective propulsor of the plurality of propulsors using electrical energy received from one or more electrical busses.

20 Claims, 5 Drawing Sheets

(51) Int. Cl.

| | | |
|---|---|---|
| *F02C 6/00* | (2006.01) | |
| *F02C 7/36* | (2006.01) | |
| *H02K 7/00* | (2006.01) | |
| *H02K 7/102* | (2006.01) | |
| *H02K 7/116* | (2006.01) | |
| *H02K 7/14* | (2006.01) | |
| *H02K 7/18* | (2006.01) | |
| *H02K 11/00* | (2016.01) | |
| *H02P 1/54* | (2006.01) | |
| *H02P 3/04* | (2006.01) | |

(52) U.S. Cl.
CPC .............. *F02C 7/36* (2013.01); *H02K 7/006* (2013.01); *H02K 7/102* (2013.01); *H02K 7/116* (2013.01); *H02K 7/14* (2013.01); *H02K 7/1823* (2013.01); *H02K 11/0094* (2013.01); *H02P 1/54* (2013.01); *F05D 2260/40311* (2013.01); *H02P 3/04* (2013.01)

(56) References Cited

U.S. PATENT DOCUMENTS

| | | |
|---|---|---|
| 9,327,600 B1 | 5/2016 | Nehmeh |
| 9,751,614 B1 | 9/2017 | Nguyen et al. |
| 10,443,504 B2* | 10/2019 | Dalal .................... F02C 7/268 |
| 11,159,024 B2 | 10/2021 | Long |
| 11,225,881 B2 | 1/2022 | Long |
| 11,370,554 B2 | 6/2022 | Long |
| 2008/0184906 A1 | 8/2008 | Kejha |
| 2010/0000814 A1 | 1/2010 | Katsuta et al. |
| 2011/0210606 A1 | 9/2011 | Selker et al. |
| 2012/0209456 A1 | 8/2012 | Harmon et al. |
| 2013/0094963 A1 | 4/2013 | Rolt |
| 2013/0099065 A1 | 4/2013 | Stuhlberger |
| 2014/0010652 A1* | 1/2014 | Suntharalingam ..... B64D 35/08 475/5 |
| 2014/0187107 A1 | 7/2014 | Gemin et al. |
| 2015/0103457 A1* | 4/2015 | Shander .................. H02J 3/381 361/88 |
| 2015/0144742 A1 | 5/2015 | Moxon et al. |
| 2015/0285165 A1 | 10/2015 | Steinwandel et al. |
| 2016/0004374 A1 | 1/2016 | Kneuper et al. |
| 2016/0023773 A1 | 1/2016 | Himmelmann et al. |
| 2016/0236790 A1 | 8/2016 | Knapp et al. |
| 2016/0257416 A1 | 9/2016 | Himmelmann et al. |
| 2017/0029131 A1 | 2/2017 | Steinwandel et al. |
| 2017/0107910 A1 | 4/2017 | Huang |
| 2017/0260872 A1* | 9/2017 | Munevar ................ B64D 27/33 |
| 2017/0275009 A1* | 9/2017 | Huang .................... B64D 27/24 |
| 2017/0291712 A1 | 10/2017 | Himmelmann et al. |
| 2017/0349293 A1 | 12/2017 | Klemen et al. |
| 2018/0065741 A1 | 3/2018 | Vondrell et al. |
| 2018/0065742 A1 | 3/2018 | Vondrell et al. |
| 2018/0079515 A1 | 3/2018 | Harwood et al. |
| 2018/0163558 A1 | 6/2018 | Vondrell et al. |
| 2018/0201384 A1 | 7/2018 | Barth et al. |
| 2018/0251226 A1* | 9/2018 | Fenny .................... B64D 27/24 |
| 2018/0346139 A1 | 12/2018 | Ferran et al. |
| 2019/0023389 A1 | 1/2019 | Murrow et al. |
| 2019/0256200 A1 | 8/2019 | Neff |
| 2019/0263519 A1 | 8/2019 | Argus |
| 2019/0322379 A1 | 10/2019 | Mackin |
| 2019/0375512 A1* | 12/2019 | Ribeiro ................ B64D 35/022 |
| 2020/0062414 A1* | 2/2020 | Hon ....................... B64D 45/00 |
| 2020/0148373 A1 | 5/2020 | Long |
| 2020/0149427 A1* | 5/2020 | Long ..................... B64D 27/02 |
| 2020/0153252 A1 | 5/2020 | Long |
| 2020/0164755 A1 | 5/2020 | Smolenaers |
| 2021/0179286 A1 | 6/2021 | Harvey et al. |
| 2021/0276723 A1 | 9/2021 | Han |
| 2021/0323691 A1 | 10/2021 | Foster et al. |
| 2022/0017064 A1 | 1/2022 | Dougherty |
| 2022/0289393 A1 | 9/2022 | Long |
| 2022/0412268 A1 | 12/2022 | Greenberg et al. |
| 2024/0002066 A1* | 1/2024 | Anderson .............. B64D 27/33 |

FOREIGN PATENT DOCUMENTS

| | | |
|---|---|---|
| EP | 3375713 A1 | 9/2018 |
| EP | 3388652 A1 | 10/2018 |
| EP | 3392148 A1 | 10/2018 |
| GB | 2574039 A | 11/2019 |
| WO | 0074964 A1 | 12/2000 |
| WO | 2017009037 A1 | 1/2017 |

OTHER PUBLICATIONS

Bradley et al. "Subsonic Ultra Green Aircraft Research: Phase II—vol. II—Hybrid Electric Design Exploration," NASA/CR-2015-218704, Apr. 2015, 233 pp.

Knapp et al., "Zunum Aero's Hybrid Electric Airplane Aims to Rejuvenate Regional Travel," IEEE Spectrum, Apr. 26, 2018, 4 pp.

Lents, "Parallel Hybrid Gas Electric Propulsion Design Space," United Technologies Research Center, Aug. 22, 2017, 13 pp.

Perkon, "Hypstair #2 Newsletter," Hypstair, Oct. 30, 2015, 12 pp.

Robinson, "How E-Fan X Will Jump-Start a New Era in Hybrid-Electric Flight," Royal Aeronautical Society, Dec. 1, 2017, 16 pp.

Extended Search Report from counterpart European Application No. 23204222.6 dated Mar. 26, 2024, 11 pp.

U.S. Appl. No. 18/159,455, filed Jan. 25, 2023, naming inventor Trawick.

Response to Extended Search Report dated Mar. 26, 2024, from counterpart European Application No. 23204222.6 filed Dec. 19, 2024, 8 pp.

* cited by examiner

HYBRID PROPULSION SYSTEMS WITH POWER SHARING

TECHNICAL FIELD

This disclosure relates to hybrid propulsion systems.

BACKGROUND

A gas turbine engine is a type of internal combustion engine that may be used to power an aircraft, another moving vehicle, or an electric generator. The turbine in a gas turbine engine may be coupled to a rotating compressor that increases a pressure of fluid flowing into the turbine. A combustor may add fuel to the compressed fluid and combust the fuel/fluid combination. The combusted fluid may enter the turbine, where it expands, causing a shaft to rotate. The rotating shaft may drive the compressor, a propulsor, other devices, and loads including an electric generator. The propulsor may use the energy from the rotating shaft to provide propulsion for the system.

Hybrid propulsion systems enable vehicles to be propelled using combinations of electrical motors and combustion motors (e.g., thermodynamic engines such as gas turbine engines). As one example, in a series hybrid propulsion system, the combustion motors may provide mechanical energy to operate one or more electrical generators, and the electrical motors may utilize power generated by the electrical generators to operate one or more propulsors. As another example, in a parallel hybrid propulsion system, the combustion motors may provide mechanical energy to operate one or more electrical generators and one or more propulsors, and the electrical motors may utilize power generated by the electrical generators to operate the propulsors that are also operated by the combustion motors. As another example, in a series-parallel hybrid propulsion system, the combustion motors may provide mechanical energy to operate one or more electrical generators and one or more propulsors, a first set of the electrical motors may utilize power generated by the electrical generators to operate the propulsors that are also operated by the combustion motors, and a second set of the electrical motors may utilize power generated by the electrical generators to operate one or more propulsors that are different than the propulsors operated by the combustion motors

SUMMARY

In general, this disclosure describes hybrid propulsion systems that enable vehicles to be propelled using combinations of electrical motors and combustion motors (e.g., thermodynamic engines such as gas turbine engines). As one example, in a series hybrid propulsion system, the combustion motors may provide mechanical energy to operate one or more electrical generators, and the electrical motors may utilize power generated by the electrical generators to operate one or more propulsors. As another example, in a parallel hybrid propulsion system, the combustion motors may provide mechanical energy to operate one or more electrical generators and one or more propulsors, and the electrical motors may utilize power generated by the electrical generators to operate the propulsors that are also operated by the combustion motors. As another example, in a series-parallel hybrid propulsion system, the combustion motors may provide mechanical energy to operate one or more electrical generators and one or more propulsors, a first set of the electrical motors may utilize power generated by the electrical generators to operate the propulsors that are also operated by the combustion motors, and a second set of the electrical motors may utilize power generated by the electrical generators to operate one or more propulsors that are different than the propulsors operated by the combustion motors.

In one example, an aircraft includes a parallel propulsion unit, the parallel propulsion unit comprising: a propulsor configured to provide forward propulsion of the aircraft; a gas turbine engine configured to drive the propulsor; an electrical machine configured to generate, for output via the one or more electrical busses, electrical energy using mechanical energy derived from the gas turbine engine; and a power sharing module configured to control a ratio of the mechanical energy derived from the gas turbine engine used to drive the propulsor and used to generate electrical energy; and a plurality of series propulsion units, each series propulsion unit of the plurality of series propulsion units comprising a respective propulsor of a plurality of propulsors that are configured to provide vertical propulsion of the aircraft and a respective electrical machine of a plurality of electrical machines, each respective electrical machine configured to drive a respective propulsor of the plurality of propulsors using electrical energy received from one or more electrical busses.

In another example, a method includes controlling, by a controller, a power sharing module configured to control a ratio of mechanical energy derived from a gas turbine engine of a parallel propulsion unit: used to drive a propulsor of the parallel propulsion unit that provides forward propulsion of an aircraft, and used by an electrical machine of the parallel propulsion unit to generate electrical energy for output via one or more electrical busses of the aircraft, wherein a plurality of series propulsion units of the aircraft provide vertical propulsion to the aircraft using electrical energy received from the one or more electrical busses; and selectively causing, by the controller, the power sharing module to cause all of the mechanical energy derived from the gas turbine engine to be used to generate electrical energy.

The details of one or more examples are set forth in the accompanying drawings and the description below. Other features, objects, and advantages will be apparent from the description and drawings, and from the claims.

DETAILED DESCRIPTION

Figure 1:
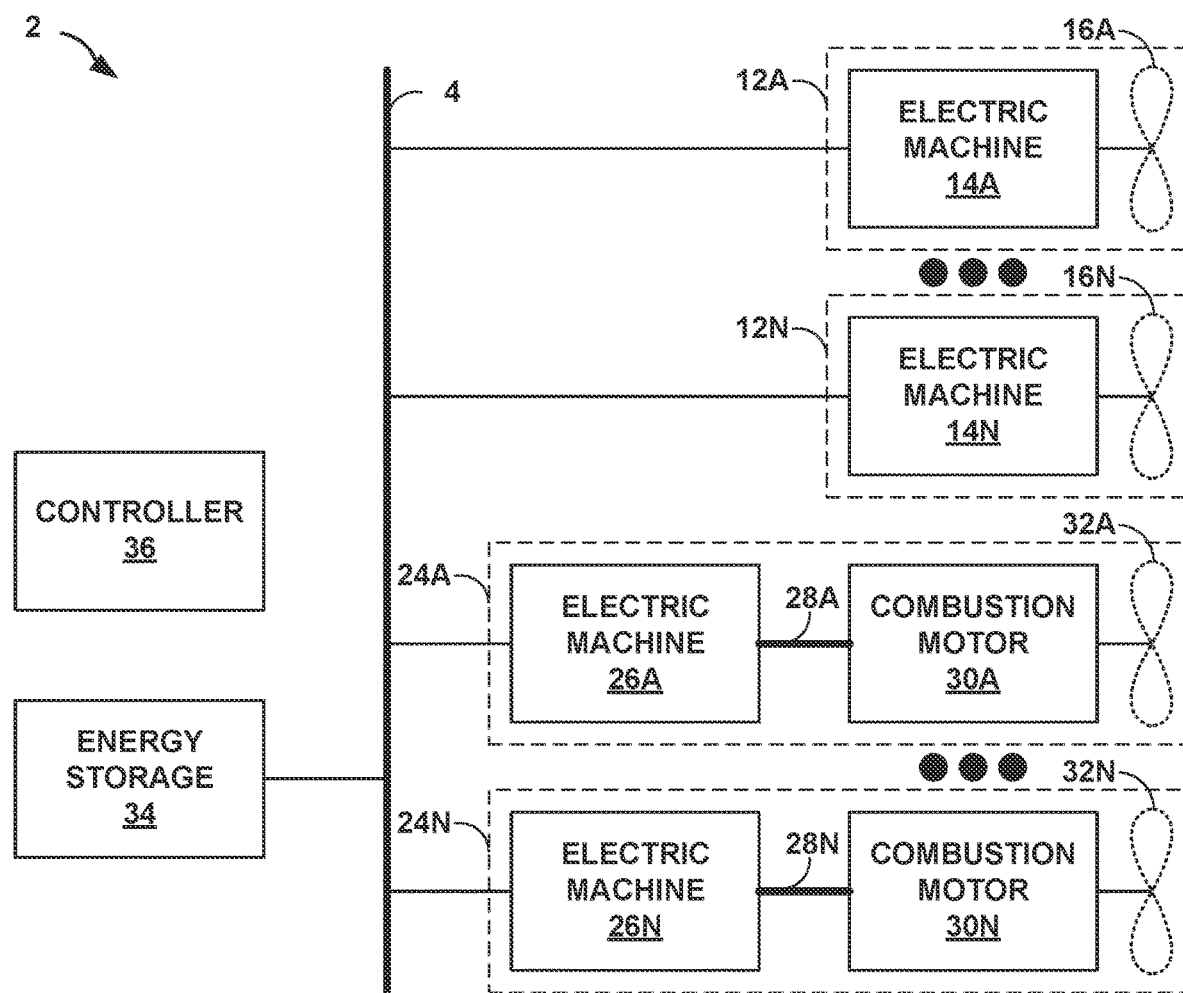
FIG. 1 is a conceptual block diagram illustrating a system that includes a hybrid propulsion system, in accordance with one or more techniques of this disclosure.

Vehicles may include combustion motors that convert chemical potential energy (e.g., fuel) to propulsion and/or to electrical power. In addition to combustion motors, vehicles may include electrical machines to create propulsion. A vehicle that includes both combustion motors and electrical machines may be referred to as a hybrid vehicle. The motors in hybrid vehicles may be configured as series, parallel, or series-parallel.

In a series configuration, the combustion motor(s) may not directly provide power to propulsors, but instead may provide power in the form of rotational mechanical energy to one or more electric generators. The generator(s) may provide electrical power to the electrical machine(s), which in turn provide power (i.e., rotational mechanical energy) to one or more propulsors. In some examples, a vehicle with motors in a series configuration may include an energy storage system (ESS) capable of storing electrical energy for subsequent use by the electrical machines. The ESS may be charged with electrical energy generated by the generator(s) using mechanical energy from the combustion motor(s), electrical energy received from a source external to the vehicle (e.g., ground power in the case of an aircraft), and/or electrical energy generated by one or more other components of the vehicle. Some other components of the vehicle that may generate electrical energy include, but are not limited to, the electrical machines (e.g., in a descent phase of flight in the case of an aircraft), solar panels, and the like.

In a parallel configuration, the combustion motor(s) and the electrical machine(s) each may directly provide power to common propulsors. For instance, a combustion motor and an electrical machine may be configured to provide power (i.e., rotational mechanical energy) to a common propulsor. The electrical machine may provide the power to the propulsor using electrical power generated via the combustion motor (e.g., at a time when the electrical machine is not providing power to the propulsor), electrical power received from an ESS, or electrical power generated by another combustion motor. In this way, the electric machine may provide a "boost" of available power (e.g., for peak thrust operations). Similar to the ESS in the series configuration, the ESS in the parallel configuration may be charged with electrical energy generated by the generator(s) using mechanical energy from the combustion motor(s), electrical energy received from a source external to the vehicle (e.g., ground power in the case of an aircraft), and/or electrical energy generated by one or more other components of the vehicle.

In a series-parallel configuration, the combustion motor(s) and the electrical machine(s) may directly provide power to propulsors. However, as opposed to the parallel configuration in which each propulsor is mechanically powered by at least a combustion motor, the series-parallel configuration includes at least one propulsor that is powered exclusively by one or more electrical machines. That is, the series-parallel configuration includes a first set of electrical machines configured to provide power to a first set of propulsors that are also directly powered by combustion motors and a second set of electrical machines configured to provide power to a second set of propulsors that are not directly powered by combustion motors. Similar to the ESS in the series and parallel configurations, the ESS in the series-parallel configuration may be charged with electrical energy generated by the generator(s) using mechanical energy from the combustion motor(s), electrical energy received from a source external to the vehicle (e.g., ground power in the case of an aircraft), and/or electrical energy generated by one or more other components of the vehicle.

In accordance with one or more aspects of the disclosure, a series-parallel configured aircraft may include a power sharing module configured to control a ratio of the mechanical energy derived from the gas turbine engine used to drive the propulsor and used to generate electrical energy. For instance, the power sharing module may be configured to selectively change from having all of the mechanical energy be used to drive the propulsor of the parallel propulsion unit, to having all of the mechanical energy be used to generate electrical energy (e.g., drive propulsor(s) of series propulsion units), or combinations both.

FIG. 1 is a conceptual block diagram illustrating a system 2 that includes a hybrid propulsion system, in accordance with one or more techniques of this disclosure. As shown in FIG. 1, system 2 includes an electrical bus 4, one or more series propulsion modules 12A-12N (collectively, "series propulsion modules 12"), one or more parallel propulsion modules 24A-24N (collectively, "parallel propulsion modules 24"), an energy storage system (ESS) 34, and a controller 36. System 2 may be included in, and provide propulsion to, any vehicle, such as an aircraft (e.g., fixed wing, rotorcraft, vertical takeoff (e.g., VTOL), short takeoff (e.g., STOL), etc.), a locomotive, or a watercraft. System 2 may include additional components not shown in FIG. 1 or may not include some components shown in FIG. 1.

Electrical bus 4 provides electrical power interconnection between various components of system 2. Electrical bus 4 may include any combination of one or more direct current (DC) bus, one or more alternating current (AC) electrical bus, or combinations thereof. As one example, electrical bus 4 may include a DC bus configured to transport electrical power between parallel propulsion modules 24, ESS 34, and series propulsion modules 12.

Series propulsion modules 12 convert electrical energy to propulsion. As shown in FIG. 1, each of series propulsion modules 12 may include one or more electrical machines and one or more propulsors. For instance, series propulsion module 12A includes electrical machine 14A and propulsor 16A, and series propulsion module 12N includes electrical machine 14N and propulsor 16N. In operation, series propulsion modules 12 may operate in a plurality of modes including, but not limited to, an electric-only mode, a regeneration mode, and a neutral mode.

When series propulsion module 12A operates in the electric-only mode, electrical machine 14A may consume electrical energy received via electrical bus 4 and convert the electrical energy to rotational mechanical energy to power propulsor 16A. When series propulsion module 12A operates in the regeneration mode, electrical machine 14A converts rotational mechanical energy received from propulsor 16A into electrical energy, and provides the electrical energy to electrical bus 4. Electrical bus 4 may distribute the electrical energy to another one of series propulsion modules 12, one of parallel propulsion modules 24, ESS 34, or combinations thereof. When series propulsion module 12A operates in the neutral mode, propulsor 16A may "windmill" and/or reduce its fluid resistance (e.g., feather and/or blend with contours of an airframe).

Each of series propulsion modules 12 may have the same or different propulsion capacities. As one example, when operating at peak power, series propulsion module 12A may be capable of generating more propulsive power than series propulsion module 12A. As another example, when operating at peak power, series propulsion module 12A may be capable of generating the same amount of propulsive power as series propulsion module 12A. As another example, series propulsion module 12A may positioned at an outboard portion of a wing to provide greater yaw control while series propulsion module 12N may be positioned at an inboard portion of the wing in order to provide primary propulsion.

Parallel propulsion modules 24 provide propulsion using fuel and electrical energy. As shown in FIG. 1, each of parallel propulsion modules 24 may include one or more electric machines, one or more combustion motors, and one or more propulsors. For instance, parallel propulsion module 24A includes electric machine 26A, combustion motor 30A, and propulsor 32A; and parallel propulsion module 24N includes electric machine 26N, combustion motor 30N, and propulsor 32N. Parallel propulsion modules 18 may operate in one or more of a plurality of modes including, but not limited to, a combustion-only mode, a combustion-generating mode, a dual-source mode, an electric-only mode, a generating mode, a regenerating mode, and a neutral mode. Each of the combustion motors included in parallel propulsion modules 24 may be any type of combustion motor. Examples of combustion motors include, but are not limited to, reciprocating, rotary, and gas-turbines.

When parallel propulsion module 24A operates in the combustion-only mode, combustion motor machine 30A may consume fuel (e.g., from a fuel tank) to provide rotational mechanical energy to propulsor 32A while electric machine 26A may neither generate electrical power nor consume electrical power. When parallel propulsion module 24A operates in the combustion-generating mode, combustion motor machine 30A may consume fuel (e.g., from a fuel tank) to provide rotational mechanical energy to propulsor 32A and electric machine 26A, and electric machine 26A may convert a portion of the rotational mechanical energy to electrical power that is output to electrical bus 4. When parallel propulsion module 24A operates in the electric-only mode, combustion motor machine 30A may be deactivated (e.g., not consume fuel) and electric machine 26A may convert electrical power received from electrical bus 4 into rotational mechanical energy to power propulsor 32A. When parallel propulsion module 24A operates in the dual-source mode, combustion motor machine 30A may consume fuel (e.g., from a fuel tank) to provide rotational mechanical energy to propulsor 32A while electric machine 26A may provide additional rotational mechanical energy to propulsor 32A using electrical energy sourced via electrical bus 4. When parallel propulsion module 24A operates in the generating mode, combustion motor machine 30A may consume fuel (e.g., from a fuel tank) to provide rotational mechanical energy to electric machine 26A, and electric machine 26A may convert to rotational mechanical energy to electrical power that is output to electrical bus 4. As compared to the combustion-generating mode, when parallel propulsion module 24A operates in the generating mode, propulsors 32 may be feathered or otherwise reduce or eliminate the amount of power taken from combustion motors 30 (e.g., de-clutch from a drive shaft) such that a majority of the power is used by electrical machines 26 to generate electrical power. When parallel propulsion module 24A operates in the regenerating mode, electric machine 26A may convert to rotational mechanical energy received from propulsor 32A to electrical power that is output to electrical bus 4. When parallel propulsion module 24A operates in the neutral mode, propulsor 22A may "windmill" and/or reduce its fluid resistance (e.g., feather and/or blend with contours of the airframe).

Each of parallel propulsion modules 24 may have the same or different propulsion capacities. As one example, when operating at peak power, parallel propulsion module 24A may be capable of generating a propulsive power than parallel propulsion module 24N. As another example, when operating at peak power, parallel propulsion module 24A may be capable of generating the same amount of propulsive power as parallel propulsion module 24N. As another example, parallel propulsion module 24A may positioned at an outboard portion of a wing to provide higher yaw control while parallel propulsion module 24N may be positioned at an inboard portion of the wing in order to provide primary propulsion.

For modules that include electric machines and combustion motors (i.e., parallel propulsion modules 24), the electric machines may be discrete components included in their own housing, or may be integral to (i.e., included/embedded in) a same housing as the combustion motors. As one example, electric machine 26A may be included in same housing and/or directly mounted to combustion motor 30A. As another example, electric machine 26A may be attached to combustion motor 30A via a drive shaft.

Additionally, for modules that include electric machines and combustion motors, the modules may include an additional starter, be started by their respective electric machine(s), or be started through some other means. As one example, combustion motor 8A may include a starter that is different than electric machine 10A. As another example, electric machine 10A may operate as a starter for combustion motor 8A.

Energy storage system (ESS) 34 may provide energy storage capacity for system 2. ESS 34 may include any devices or systems capable of storing energy (e.g., electrical energy). Examples of devices that may be included ESS 34 include, but are not limited to, batteries, capacitors, supercapacitors, flywheels, pneumatic storage, and any other device capable of storing electrical energy or energy that may be converted to electrical energy (without combustion). ESS 34 may be coupled to electrical bus 4 and may be capable of providing electrical energy to electrical bus 4 and receiving electrical energy (e.g., for charging) from electrical bus 4.

In some examples, ESS 34 may include multiple energy storage systems. For instance, ESS 34 may include a first energy storage system configured to store and provide electrical energy for propulsion and a second energy storage system configured to store and provide electrical energy for other systems, such as avionics and/or hotel loads. In some examples, ESS 34 may include a single energy storage system. For instance, ESS 34 may include a single energy storage system configured to store and provide electrical energy for propulsion and other systems.

In some examples, one or more components of ESS 34 may be swappable. For example, one or more batteries of ESS 34 may be swappable while an aircraft including system 2 is on the ground. As such, the aircraft may be quickly able to return to a fully charged state without the need to charge the batteries on the ground.

Controller 36 may control the operation of one or more components of system 2. For instance, controller 36 may control the operation of electrical bus 4, series propulsion modules 12, parallel propulsion modules 24, and ESS 34. In some examples, controller 36 may include a single controller that controls all of the components. In other examples, controller 36 may include multiple controllers that each control one or more components. Where controller 36 includes multiple controllers, the controllers may be arranged in any configuration. As one example, controller 36 may include a separate controller for each module type. For instance, controller 36 may include a first controller that controls series propulsion modules 12, and a second controller that controls parallel propulsion modules 24. As another example, controller 36 may include a separate controller for each module, or sub-module, within the module types. For instance, controller 36 may include a separate controller for each of series propulsion modules 12, and a separate controller for each of parallel propulsion modules 24.

Controller 36 may comprise any suitable arrangement of hardware, software, firmware, or any combination thereof, to perform the techniques attributed to controller 36 herein. Examples of controller 36 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 36 includes software or firmware, controller 36 further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 1, controller 36 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 36 (e.g., may be external to a package in which controller 36 is housed).

In operation, system 2 may include and be propelled by any combination of series propulsion modules 12, and parallel propulsion modules 24. As one example, in what may be referred to as a "series-parallel configuration," system 2 may include one or more series propulsion modules 12 and one or more parallel propulsion modules 24. For instance, in the series-parallel configuration, both series propulsion modules 12 and parallel propulsion modules 24 may provide propulsive force to a vehicle that includes system 2.

In accordance with one or more aspects of the disclosure, system 2 may be configured to adjust a distribution of power generated by combustion motors 30 between propulsors 16 (i.e., propulsors of series propulsion modules 12) and propulsors 32 (i.e., propulsors of parallel propulsion modules 24). For instance, system 2 may adjust how much of the power generated by combustion motors 30 is mechanically transmitted to propulsors 32 versus how much of the power generated by combustion motors 30 is converted into electrical energy by electrical machines 26, output onto electrical bus 4 (e.g., used by electric machines 14 to drive propulsors 16 and/or to charge ESS 34).

The aforementioned adjustable power distribution may provide several advantages. As one example, such techniques may enable combustion motors 30 to operate at a peak efficiency level, which may improve energy efficiency. As another example, where both series propulsion modules 12 and parallel propulsion modules 24 are configured to provide forward propulsive force to a vehicle (e.g., an aircraft), such techniques may enable system 2 to operate propulsors 16 and 32 at relatively low rotational speeds (e.g., low RPMs) in normal operation, thereby lowering noise levels. However, in the event of a failure or other issue of series propulsion modules 12, system 2 can cause all of the power generated by combustion motors 30 to be mechanically transmitted to propulsors 32, which may increase noise levels but still enable safe continued operation of a vehicle that includes system 2. Similarly, where series propulsion modules 12 are configured to provide vertical force (e.g., vertical takeoff force) to a vehicle and parallel propulsion modules 24 are configured to provide forward propulsive force to the vehicle, such techniques may enable system 2 to operate propulsors 16 and 32 transition from vertical flight to forward flight (e.g., perform VTOL).

Where multiple propulsion modules are present (e.g., multiple instances of a specific type of propulsion module, multiple different types of propulsion modules, or combinations thereof), the multiple propulsion modules may be controlled independently, collectively in groups, or completely collectively. As one example, in an example where system 2 includes multiple series propulsion modules 12, each of series propulsion modules 12 may be independently controlled. As another example, in an example where system 2 includes multiple series propulsion modules 12, all of series propulsion modules 12 may be collectively controlled. As another example, in an example where system 2 includes multiple series propulsion modules 12, a first set of series propulsion modules 12 may be collectively controlled and a second set of series propulsion modules 12 may be collectively controlled independently from the first set of series propulsion modules 12. As another example, in an example where system 2 includes multiple series propulsion modules 12 and multiple parallel propulsion modules 24, the series propulsion modules 12 may be collectively controlled and the parallel propulsion modules 24 may be collectively controlled independently from the series propulsion modules 12.

Any or all of the combustion motors described above (i.e., combustion motors 30) may in some examples, be recuperated. That is, system 2 may include one or more recuperators configured to improve the cycle efficiency of the combustion motor(s). For instance, the recuperator may place an exhaust air flow that is downstream from a combustor in a combustion motor in a heat exchange relationship with a compressed airflow that is upstream from the combustor such that the recuperator transfers thermal energy from the exhaust airflow to the compressed airflow.

In some examples, system 2 may include an auxiliary power unit (APU). For instance, system 2 may include an APU (e.g., a relatively small gas-turbine engine coupled to a generator) configured to supply electrical energy to bus 4. In other examples, system 2 may not include an APU.

Figure 2:
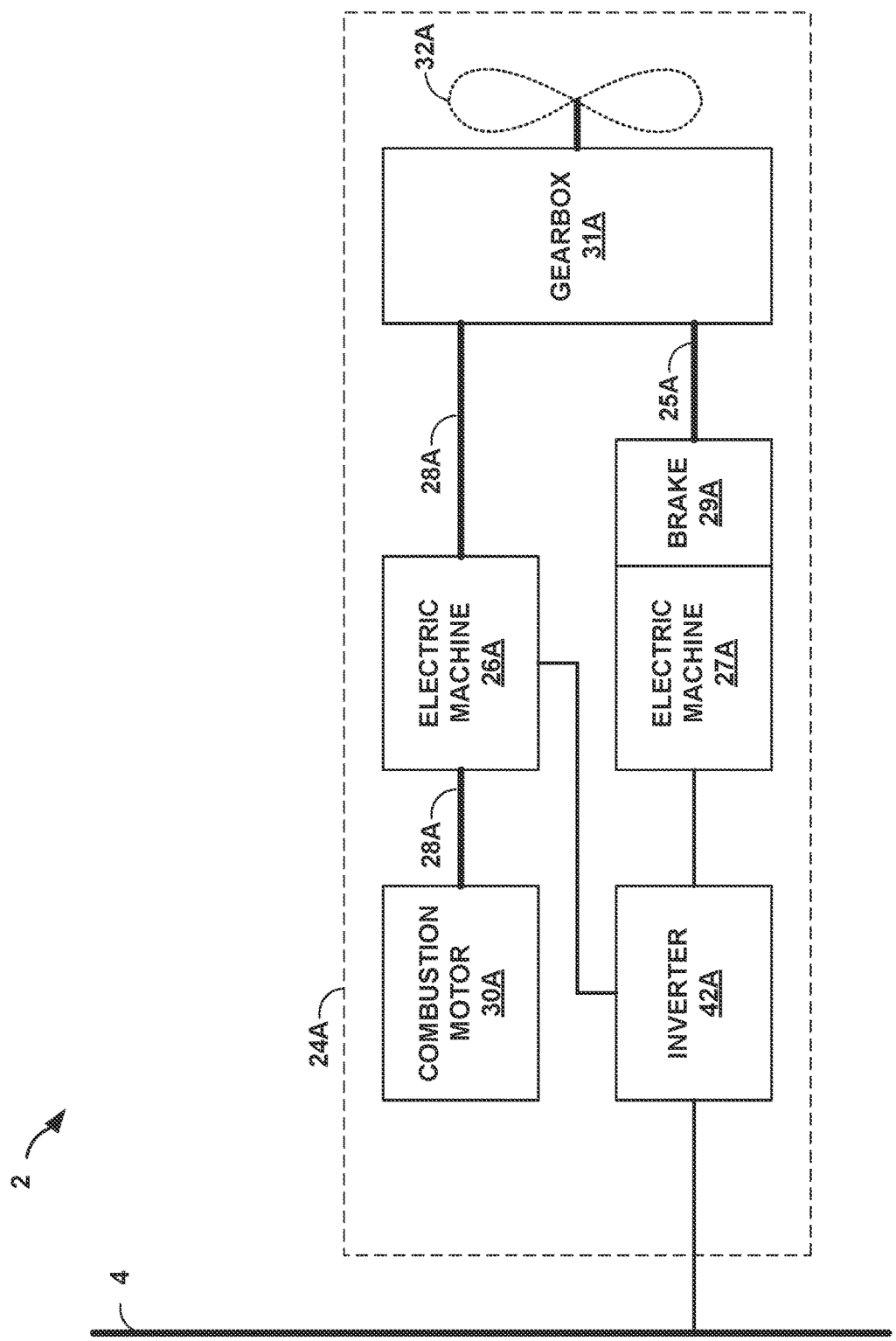
FIG. 2 is a conceptual block diagram illustrating one example of a propulsion module configured to adjust power distribution, in accordance with one or more aspects of the disclosure.

FIG. 2 is a conceptual block diagram illustrating one example of a propulsion module configured to adjust power distribution, in accordance with one or more aspects of the disclosure. As shown in FIG. 2, parallel propulsion module 24A may include electric machine 26A, combustion motor 30A, electric machine 27A, brake 29A, gearbox 31A, propulsor 32A, and inverter 42A.

Combustion motor 30A and electric machine 26A may be connected to a shaft, such as shaft 28A. For instance, combustion motor 30A may output rotational mechanical energy onto shaft 28A, and electric machine 26A may output or extract rotational mechanical energy from shaft 28A.

Electric machine 27A may be connected to a shaft, such as shaft 25A. For instance, and electric machine 27A may output or extract rotational mechanical energy from shaft 25A. Brake 29A may be configured to slow or inhibit rotation of shaft 25A.

Electric machine 26A and electric machine 27A may be connected to inverter 42A via electrical cables. Electric machine 27A may be referred to as an independent motor in that it is not on a same shaft as a combustion motor.

Inverter 42A may operate as a power converter. For instance, inverter 42A may operate as an AC/DC converter that converts AC electrical energy of electric machines 26A and 27A to DC electrical energy of electrical bus 4.

Gearbox 31A may be an additive gearbox, such as a planetary gearbox that connects three shafts which have independent speeds. For example, gearbox 31A may be a planetary gearbox with propulsor 32A connected to a ring gear, electric machine 27A connected to a sun gear (e.g., shaft 25A may be connected to the sun gear), and combustion motor 30/electric machine 26A connected to a planet carrier (e.g., shaft 28A may be connected to the planet carrier). As such, a speed of shaft 25A (e.g., a speed of electric machine 27A) may add or subtract from a speed of shaft 28A (e.g., a speed of combustion motor 30/electric machine 26A) to control a rotational speed of propulsor 32A (which may be multiplied by fixed gear ratios).

A controller, such as controller 36 of FIG. 1, may control speeds of electric machine 26A and/or 27A to adjust how much of the power (e.g., rotational mechanical energy) gets transmitted to propulsor 32A versus gets turned into electrical energy (e.g., and output onto electrical bus 4) by electric machine 26A and/or 27A. For instance, while holding the amount of power produced by combustion motor 30A constant, the controller may cause electric machine 26A and/or 27A to generate increased amounts of electrical energy (e.g., for output to electrical bus 4) to reduce the amount of power transmitted to propulsor 32A. Similarly, the controller may cause electric machine 26A and/or 27A to generate decreased amounts of electrical energy (e.g., for output to electrical bus 4) to increase the amount of power transmitted to propulsor 32A.

As described above, parallel propulsion module 24A may operate as a variable transmission. For instance, gearbox 31A, electric machine 27A, and brake 29A may operate as a power sharing module configured to control a ratio of the mechanical energy derived from the gas turbine engine used to drive the propulsor and used to generate electrical energy. As noted above, the power sharing module may adjust the ratio by adjusting rotational speeds of electric machine 26A and/or 27A, and/or by triggering brake 29A.

In the event of a failure or other condition, the controller may cause brake 29A to cause shaft 25A to cease rotation. With shaft 25A being blocked from rotation, the controller may cause electric machine 26A to not impart any force on shaft 28A. In such a scenario, all of the power generated by combustion motor 30A may be transmitted to propulsor 32A. Such a design may enable a simpler design to be used for electric machine 27A as opposed to electric machine 26A. For instance, it may not be necessary for electric machine 27A to be designed to be capable of continued rotation (e.g., in the event of an internal fault).

As shown in FIG. 1, in some examples, system 2 may include an ESS (e.g., ESS 34). As such, in some examples, combustion motor 30A may be stopped and propulsor 32A may still provide propulsive force. For instance, one or both of electric machine 26A and/or 27A may receive (e.g., via inverter 42A) electrical energy from the ESS (e.g., via electrical bus 4), and use the received electrical energy to cause propulsor 32A to rotate. Such an arrangement may be useful to reduce a noise output (e.g., for a stealth/low noise near residential airport application). Additionally or alternatively, shaft 28A may be rotated by electric machine 26A, thereby enabling a rapid restart of combustion motor 30A.

Figure 3:
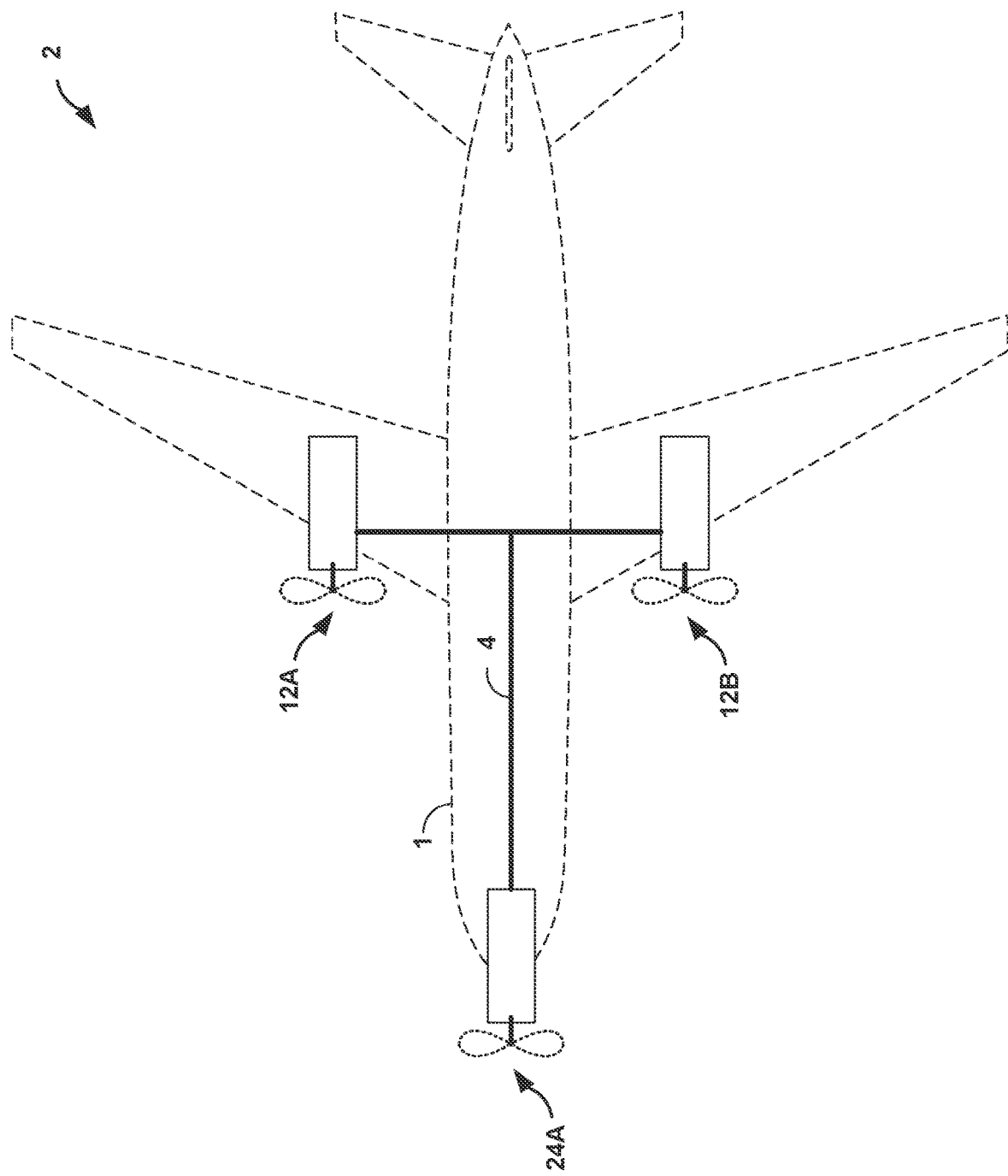
FIG. 3 is a conceptual diagram illustrating an example aircraft, in accordance with one or more aspects of the disclosure.

FIG. 3 is a conceptual diagram illustrating an example aircraft, in accordance with one or more aspects of the disclosure. Aircraft 1 of FIG. 3 may be an aircraft that includes system 2, which may provide propulsive force to aircraft 1. Examples of aircraft 1 include, but are not limited to fixed wing, rotorcraft, vertical takeoff (e.g., VTOL), short takeoff (e.g., STOL), and the like.

As shown in FIG. 3, a parallel propulsion unit, such parallel propulsion unit 24A may be mounted in a centerline of aircraft 1. A plurality of series propulsion units, such as series propulsion units 12A and 12B, may be mounted mirrored about the centerline (e.g., on wings of the aircraft).

In normal forward flight, all of parallel propulsion unit 24A and series propulsion units 12A and 12B may provide forward propulsion to aircraft 1. For instance, a gas turbine engine of parallel propulsion unit 24A may generate rotational mechanical energy, a power sharing module of parallel propulsion unit 24A may cause some of the rotational mechanical energy to drive a propulsor of parallel propulsion unit 24A and some of the rotational mechanical energy to drive electrical generator(s). The electrical generator(s) may output generated electrical energy onto electrical bus 4, and series propulsion units 12A and 12B may receive electrical energy from electrical bus 4 and use the received electrical energy to drive propulsors of series propulsion units 12A and 12B.

As noted above, a controller, such as controller 36 of FIG. 1, may control a ratio of the mechanical energy derived from the gas turbine engine used to drive the propulsor and used to generate electrical energy. For instance, the controller may control operation of a power sharing module (e.g., components of the parallel propulsion module). In at least the example of FIG. 3, controller 36 may selectively cause the power sharing module to cause all of the mechanical energy derived from the gas turbine engine to be used to drive the propulsor of the parallel propulsion unit. For instance, the controller may determine whether a fault has occurred in aircraft 1; and responsive to determining that the fault has occurred, cause the power sharing module to cause all of the mechanical energy derived from the gas turbine engine to be used to drive the propulsor of parallel propulsion unit 24A. The fault may be a fault that may impede operation of the series propulsion units. For instance, the fault may be a fault in electrical bus 4 or series propulsion units 12A and 12B.

Figure 4:
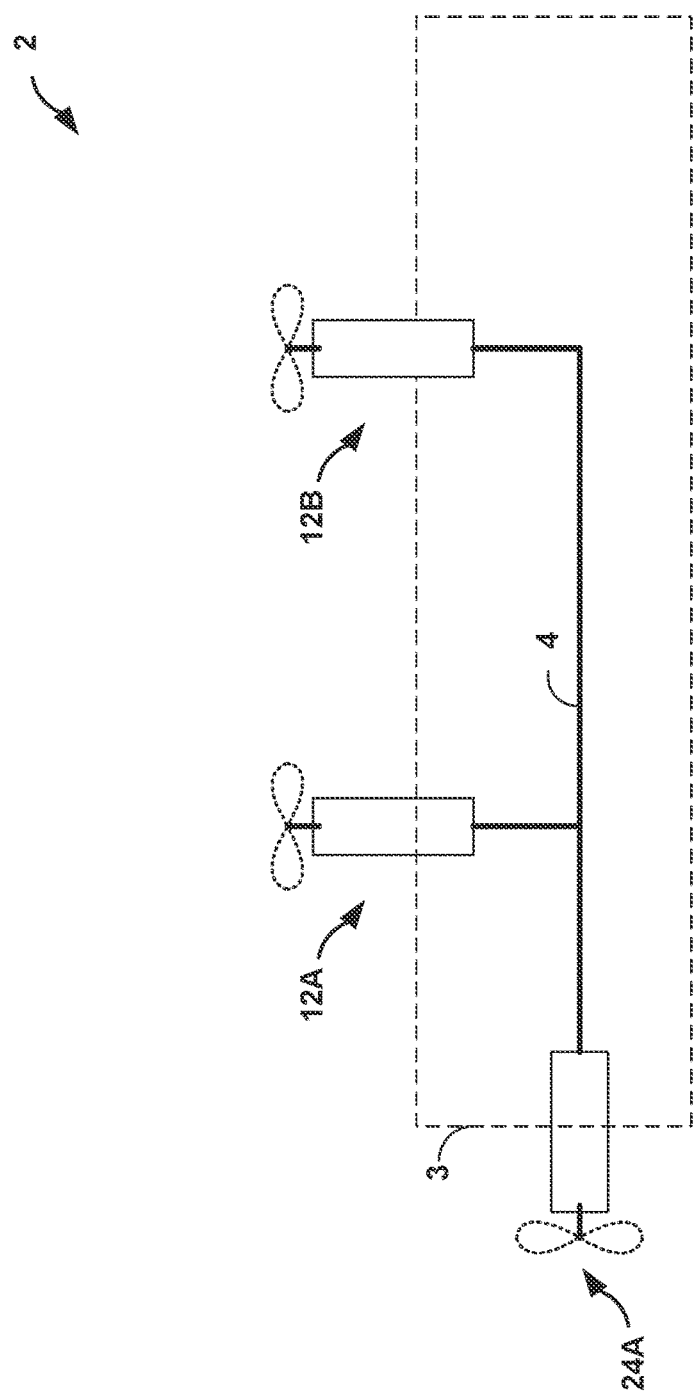
FIG. 4 is a conceptual diagram illustrating an example aircraft, in accordance with one or more aspects of the disclosure.

FIG. 4 is a conceptual diagram illustrating an example aircraft, in accordance with one or more aspects of the disclosure. Aircraft 3 of FIG. 4 may be an aircraft that includes system 2, which may provide propulsive force to aircraft 3. Examples of aircraft 3 include, but are not limited to fixed wing, rotorcraft, vertical takeoff (e.g., VTOL), short takeoff (e.g., STOL), and the like.

As shown in FIG. 4, aircraft 3 may include parallel propulsion unit 24A and series propulsion units 12A and 12B. Parallel propulsion unit 24A may be configured to provide forward propulsion to aircraft 3 and series propulsion units 12A and 12B may be configured to provide vertical thrust to aircraft 3. As such, the thrust provided by parallel propulsion unit 24A may be substantially perpendicular to the thrust provided by series propulsion units 12A and 12B. In some examples, series propulsion units 12A and 12B may be "tiltable" such that the thrust provided by series propulsion units 12A and 12B may be adjusted from vertical thrust to forward thrust (e.g., forward propulsion). Parallel propulsion unit 24A may include a tractor propulsor or a pusher propulsor.

As noted above, a controller, such as controller 36 of FIG. 1, may control a ratio of the mechanical energy derived from the gas turbine engine used to drive the propulsor and used to generate electrical energy. For instance, the controller may control operation of a power sharing module (e.g., components of the parallel propulsion module). In at least the example of FIG. 4, controller 36 may selectively cause the power sharing module to cause all of the mechanical energy derived from the gas turbine engine to be used to drive the propulsor of the parallel propulsion unit, all of the mechanical energy derived from the gas turbine engine to be used to generate electrical energy (e.g., for use by series propulsion units 12A and 12B), or a combination of the same. For instance, the controller may cause all of the mechanical energy derived from the gas turbine engine to be used to drive the propulsor of the parallel propulsion unit when aircraft 3 is in forward flight, all of the mechanical energy derived from the gas turbine engine to be used to generate electrical energy (e.g., for use by series propulsion units 12A and 12B) when aircraft 3 is performing a vertical takeoff or a hover, or a combination of the same when transitioning to and from forward flight.

In any of the aforementioned examples, the electrical energy output onto electrical bus 4 by the parallel propulsion units can also power additional electric loads, such as loads in addition to the series propulsion units (e.g., at different stages of the mission-redirecting power when not needed for propulsion, and be supplemented by a battery, both of which may require power converters/inverters to be connected to the electrical bus).

Figure 5:
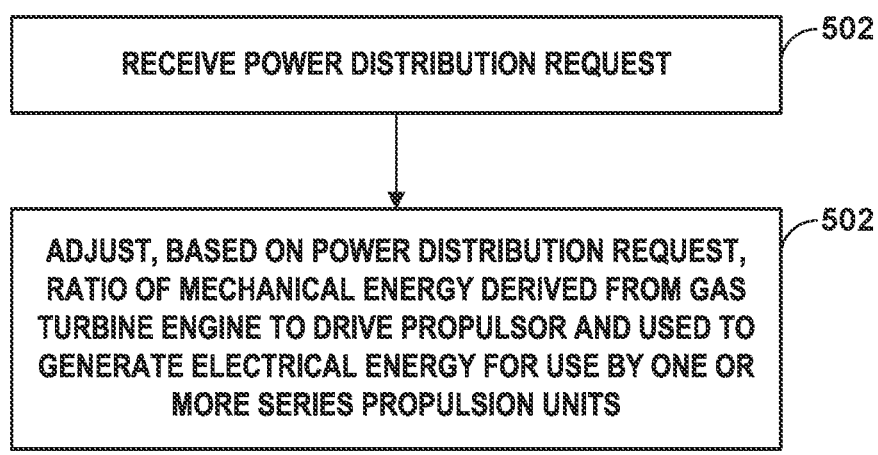
FIG. 5 is a flowchart illustrating an example technique for controlling a hybrid propulsion system, in accordance with one or more aspects of this disclosure.

FIG. 5 is a flowchart illustrating an example technique for controlling a hybrid propulsion system, in accordance with one or more aspects of this disclosure. The techniques of FIG. 5 are discussed with reference to system 2 of FIG. 1, however other systems may perform the techniques of FIG. 5.

Controller 36 of system 2 may receive a power distribution request (502). As one example, where series propulsion units are configured to provide thrust parallel to the parallel propulsion unit, controller 36 may determine that either the aircraft is operating normally, or a fault has occurred. As another example, where series propulsion units are configured to provide thrust perpendicular to the parallel propulsion unit, controller 36 may determine that either the aircraft is operating in straight and level flight, or is performing a hover or vertical takeoff.

Controller 36 may adjust, based on the power distribution request, a ratio of instance, controller 36 may adjust a ratio of mechanical energy derived from gas turbine engine 30A of parallel propulsion unit 24A: used to drive propulsor 32A of parallel propulsion unit 24A that provides forward propulsion of aircraft 3, and used by electrical machine 26A/27A to generate electrical energy for output via one or more electrical busses 4. As one example, where series propulsion units are configured to provide thrust parallel to the parallel propulsion unit and responsive to determining that a fault has occurred, controller 36 may control the power distribution unit 31A to cause all of the mechanical energy derived from gas turbine engine 30A to be used to drive propulsor 32A. As another example, where series propulsion units are configured to provide thrust perpendicular to the parallel propulsion unit and responsive to determining that the aircraft is performing a hover or vertical takeoff, controller 36 may cause power sharing module 31A to cause all of the mechanical energy derived from gas turbine engine 30A to be used to generate electrical energy.

The following examples may illustrate one or more aspects of the disclosure:

Example 1A. An aircraft comprising: a parallel propulsion unit, the parallel propulsion unit comprising: a propulsor configured to provide forward propulsion of the aircraft; a gas turbine engine configured to drive the propulsor; an electrical machine configured to generate, for output via the one or more electrical busses, electrical energy using mechanical energy derived from the gas turbine engine; and a power sharing module configured to control a ratio of the mechanical energy derived from the gas turbine engine used to drive the propulsor and used to generate electrical energy; and a plurality of series propulsion units, each series propulsion unit of the plurality of series propulsion units comprising a respective propulsor of a plurality of propulsors that are configured to provide forward propulsion of the aircraft and a respective electrical machine of a plurality of electrical machines, each respective electrical machine configured to drive a respective propulsor of the plurality of propulsors using electrical energy received from one or more electrical busses.

Example 2A. The aircraft of example 1A, wherein the electrical machine of the parallel propulsion unit comprises a first electrical machine, and wherein the power sharing module comprises: a gearbox, wherein an output shaft of the gas turbine engine is connected to a first input of the gearbox, and wherein the propulsor of the parallel propulsion unit is connected to an output of the gearbox; and a second electrical machine connected to a second input of the gearbox.

Example 3A. The aircraft of example 2A, wherein the first electrical machine is connected to the output shaft of the gas turbine engine.

Example 4A. The aircraft of example 3A, wherein the gearbox comprises a planetary gearbox.

Example 5A. The aircraft of any of examples 1A-4A, further comprising: a mechanical brake configured to selectively inhibit rotation of the second electrical machine.

Example 6A. The aircraft of example 5A, further comprising a controller configured to: selectively cause the power sharing module to cause all of the mechanical energy derived from the gas turbine engine to be used to drive the propulsor of the parallel propulsion unit.

Example 7A. The aircraft of example 6A, wherein, to selectively cause the power sharing module to cause all of the mechanical energy derived from the gas turbine engine to be used to drive the propulsor of the parallel propulsion unit, the controller is configured to: determine whether a fault has occurred in the aircraft; and responsive to determining that the fault has occurred, cause the power sharing module to cause all of the mechanical energy derived from the gas turbine engine to be used to drive the propulsor of the parallel propulsion unit.

Example 8A. The aircraft of example 7A, wherein, to determine whether the fault has occurred, the controller is configured to determine whether a fault has occurred in the one or more electrical busses or the plurality of series propulsion units.

Example 9A. The aircraft of any of examples 6A-8A, wherein, to selectively cause the power sharing module to cause all of the mechanical energy derived from the gas turbine engine to be used to drive the propulsor of the parallel propulsion unit, the controller is configured to: cause the mechanical brake to inhibit rotation of the second electrical machine.

Example 10A. The aircraft of any of examples 6A-8A, wherein causing all of the mechanical energy derived from the gas turbine engine to be used to drive the propulsor of the parallel propulsion unit causes an increase in a rotational speed of the propulsor of the parallel propulsion unit.

Example 11A. The aircraft of any of examples 6A-8A, wherein the controller is further configured to: selectively cause the power sharing module to cause all of the mechanical energy derived from the gas turbine engine to be used to generate electrical energy.

Example 12A. The aircraft of any of examples 1A-11A, wherein a noise level emitted by the aircraft is correlated to the ratio of the mechanical energy derived from the gas turbine engine used to drive the propulsor and used to generate electrical energy.

Example 13A. The aircraft of any of examples 1A-112, wherein the plurality of propulsors comprise variable pitch propellers.

Example 14A. The aircraft of any of examples 1A-13A, further comprising: one or more electrical energy storage devices operably coupled to at least one of the one or more electrical busses, wherein the one or more electrical energy storage devices are configured to both: charge using electrical energy sourced via the at least one of the one or more electrical busses; and discharge to provide electrical energy to the at least one of the one or more electrical busses.

Example 15A. The aircraft of any of examples 1A-14A, wherein the system does not include an auxiliary power unit (APU) configured to output electrical energy onto the one or more electrical busses.

Example 16A. The aircraft of any of examples 1A-14A, wherein the system includes an auxiliary power unit (APU) configured to output electrical energy onto the one or more electrical busses.

Example 17A. The aircraft of any of examples 1A-16A, wherein the aircraft comprises a fixed wing aircraft.

Example 18A. The aircraft of any of examples 1A-17A, wherein the parallel propulsion unit is mounted on a centerline of the aircraft.

Example 19A. A method comprising: controlling, by a controller, a power sharing module configured to control a ratio of mechanical energy derived from a gas turbine engine of a parallel propulsion unit: used to drive a propulsor of the parallel propulsion unit that provides forward propulsion of an aircraft, and used by an electrical machine of the parallel propulsion unit to generate electrical energy for output via one or more electrical busses of the aircraft, wherein a plurality of series propulsion units of the aircraft provide forward propulsion using electrical energy received from the one or more electrical busses; and selectively causing, by the controller, the power sharing module to cause all of the mechanical energy derived from the gas turbine engine to be used to drive the propulsor of the parallel propulsion unit.

Example 20A. The method of example 19A, wherein selectively causing the power sharing module to cause all of the mechanical energy derived from the gas turbine engine to be used to drive the propulsor of the parallel propulsion unit comprises: determining whether a fault has occurred in the aircraft; and causing, responsive to determining that the fault has occurred, the power sharing module to cause all of the mechanical energy derived from the gas turbine engine to be used to drive the propulsor of the parallel propulsion unit.

Example 1B. An aircraft comprising: a parallel propulsion unit, the parallel propulsion unit comprising: a propulsor configured to provide forward propulsion of the aircraft; a gas turbine engine configured to drive the propulsor; an electrical machine configured to generate, for output via the one or more electrical busses, electrical energy using mechanical energy derived from the gas turbine engine; and a power sharing module configured to control a ratio of the mechanical energy derived from the gas turbine engine used to drive the propulsor and used to generate electrical energy; and a plurality of series propulsion units, each series propulsion unit of the plurality of series propulsion units comprising a respective propulsor of a plurality of propulsors that are configured to provide vertical propulsion of the aircraft and a respective electrical machine of a plurality of electrical machines, each respective electrical machine configured to drive a respective propulsor of the plurality of propulsors using electrical energy received from one or more electrical busses.

Example 2B. The aircraft of example 1B, wherein the electrical machine of the parallel propulsion unit comprises a first electrical machine, and wherein the power sharing module comprises: a gearbox, wherein an output shaft of the gas turbine engine is connected to a first input of the gearbox, and wherein the propulsor of the parallel propulsion unit is connected to an output of the gearbox; and a second electrical machine connected to a second input of the gearbox.

Example 3B. The aircraft of example 2B, wherein the first electrical machine is connected to the output shaft of the gas turbine engine.

Example 4B. The aircraft of example 3B, wherein the gearbox comprises a planetary gearbox.

Example 5B. The aircraft of any of examples 2B-4B, further comprising: a mechanical brake configured to selectively inhibit rotation of the second electrical machine.

Example 6B. The aircraft of example 5B, further comprising a controller configured to: selectively cause the power sharing module to cause all of the mechanical energy derived from the gas turbine engine to be used to drive the propulsor of the parallel propulsion unit.

Example 7B. The aircraft of example 6B, wherein the controller is configured to selectively cause the power sharing module to cause all of the mechanical energy derived from the gas turbine engine to be used to drive the propulsor of the parallel propulsion unit when the aircraft is in forward flight.

Example 8B. The aircraft of example 6B or 7B, wherein, to selectively cause the power sharing module to cause all of the mechanical energy derived from the gas turbine engine to be used to drive the propulsor of the parallel propulsion unit, the controller is configured to: cause the mechanical brake to inhibit rotation of the second electrical machine.

Example 9B. The aircraft of any of examples 6B-8B, wherein the controller is further configured to: selectively cause the power sharing module to cause all of the mechanical energy derived from the gas turbine engine to be used to generate electrical energy.

Example 10B. The aircraft of example 9B, wherein the controller is configured to selectively cause the power sharing module to cause all of the mechanical energy derived from the gas turbine engine to be used to drive the propulsor of the parallel propulsion unit when the aircraft is performing a vertical takeoff or a hover.

Example 11B. The aircraft of example 10B, wherein the controller is configured to the ratio from causing all of the mechanical energy derived from the gas turbine engine to be used to generate electrical energy to causing all of the mechanical energy derived from the gas turbine engine to be used to drive the propulsor of the parallel propulsion unit as the aircraft transitions from performing the vertical takeoff to forward flight.

Example 12B. The aircraft of any of examples 1B-11B, wherein a noise level emitted by the aircraft is correlated to the ratio of the mechanical energy derived from the gas turbine engine used to drive the propulsor and used to generate electrical energy.

Example 13B. The aircraft of any of examples 1B-12B, wherein the plurality of propulsors comprise variable pitch propellers.

Example 14B. The aircraft of any of examples 1B-13B, further comprising: one or more electrical energy storage devices operably coupled to at least one of the one or more electrical busses, wherein the one or more electrical energy storage devices are configured to both: charge using electrical energy sourced via the at least one of the one or more electrical busses; and discharge to provide electrical energy to the at least one of the one or more electrical busses.

Example 15B. The aircraft of any of examples 1B-14B, wherein the system does not include an auxiliary power unit (APU) configured to output electrical energy onto the one or more electrical busses.

Example 16B. The aircraft of any of examples 1B-14B, wherein the system includes an auxiliary power unit (APU) configured to output electrical energy onto the one or more electrical busses.

Example 17B. The aircraft of any of examples 1B-16B, wherein the aircraft comprises a fixed wing aircraft.

Example 18B. The aircraft of any of examples 1B-17B, wherein the parallel propulsion unit is mounted on a centerline of the aircraft.

Example 19B. A method comprising: controlling, by a controller, a power sharing module configured to control a ratio of mechanical energy derived from a gas turbine engine of a parallel propulsion unit: used to drive a propulsor of the parallel propulsion unit that provides forward propulsion of an aircraft, and used by an electrical machine of the parallel propulsion unit to generate electrical energy for output via one or more electrical busses of the aircraft, wherein a plurality of series propulsion units of the aircraft provide vertical propulsion to the aircraft using electrical energy received from the one or more electrical busses; and selectively causing, by the controller, the power sharing module to cause all of the mechanical energy derived from the gas turbine engine to be used to generate electrical energy.

Example 20B. The method of example 19B, wherein selectively causing the power sharing module to cause all of the mechanical energy derived from the gas turbine engine to be used to generate electrical energy comprises: causing, when the aircraft is performing a vertical takeoff or a hover, the power sharing module to cause all of the mechanical energy derived from the gas turbine engine to be used to generate electrical energy.

Various examples have been described. These and other examples are within the scope of the following claims.

What is claimed is:

1. An aircraft comprising:
a parallel propulsion unit, the parallel propulsion unit comprising:
  a propulsor configured to provide forward propulsion of the aircraft;
  a gas turbine engine configured to drive the propulsor;
  an electrical machine configured to generate, for output via one or more electrical busses, electrical energy using mechanical energy derived from the gas turbine engine; and
  a power sharing module configured to mechanically control a ratio of the mechanical energy derived from the gas turbine engine used to drive the propulsor and used to generate electrical energy; and
a plurality of series propulsion units, each series propulsion unit of the plurality of series propulsion units comprising a respective propulsor of a plurality of propulsors that are configured to provide vertical propulsion of the aircraft and a respective electrical machine of a plurality of electrical machines, each respective electrical machine configured to drive a respective propulsor of the plurality of propulsors using electrical energy received from one or more electrical busses; and
a controller configured to selectively cause the power sharing module to cause all of the mechanical energy derived from the gas turbine engine to be used to generate electrical energy.

2. The aircraft of claim 1, wherein the electrical machine of the parallel propulsion unit comprises a first electrical machine, and wherein the power sharing module comprises:
a gearbox, wherein an output shaft of the gas turbine engine is connected to a first input of the gearbox, and wherein the propulsor of the parallel propulsion unit is connected to an output of the gearbox; and
a second electrical machine connected to a second input of the gearbox.

3. The aircraft of claim 2, wherein the first electrical machine is connected to the output shaft of the gas turbine engine.

4. The aircraft of claim 3, wherein the gearbox comprises a planetary gearbox.

5. The aircraft of claim 2, further comprising:
a mechanical brake configured to selectively inhibit rotation of the second electrical machine.

6. The aircraft of claim 5, wherein the controller is further configured to:
selectively cause the power sharing module to cause all of the mechanical energy derived from the gas turbine engine to be used to drive the propulsor of the parallel propulsion unit.

7. The aircraft of claim 6, wherein the controller is configured to selectively cause the power sharing module to cause all of the mechanical energy derived from the gas turbine engine to be used to drive the propulsor of the parallel propulsion unit when the aircraft is in forward flight.

8. The aircraft of claim 6, wherein, to selectively cause the power sharing module to cause all of the mechanical energy derived from the gas turbine engine to be used to drive the propulsor of the parallel propulsion unit, the controller is configured to:
cause the mechanical brake to inhibit rotation of the second electrical machine.

9. The aircraft of claim 1, wherein the controller is configured to selectively cause the power sharing module to cause all of the mechanical energy derived from the gas turbine engine to be used to drive the propulsor of the parallel propulsion unit when the aircraft is performing a vertical takeoff or a hover.

10. The aircraft of claim 9, wherein the controller is configured to the ratio from causing all of the mechanical energy derived from the gas turbine engine to be used to generate electrical energy to causing all of the mechanical energy derived from the gas turbine engine to be used to drive the propulsor of the parallel propulsion unit as the aircraft transitions from performing the vertical takeoff to forward flight.

11. The aircraft of claim 1, wherein a noise level emitted by the aircraft is correlated to the ratio of the mechanical energy derived from the gas turbine engine used to drive the propulsor and used to generate electrical energy.

12. The aircraft of claim 1, wherein the plurality of propulsors comprise variable pitch propellers.

13. The aircraft of claim 1, further comprising:
one or more electrical energy storage devices operably coupled to at least one of the one or more electrical busses, wherein the one or more electrical energy storage devices are configured to both:
charge using electrical energy sourced via the at least one of the one or more electrical busses; and
discharge to provide electrical energy to the at least one of the one or more electrical busses.

14. The aircraft of claim 1, wherein the aircraft does not include an auxiliary power unit (APU) configured to output electrical energy onto the one or more electrical busses.

15. The aircraft of claim 1, wherein the aircraft includes an auxiliary power unit (APU) configured to output electrical energy onto the one or more electrical busses.

16. The aircraft of claim 1, wherein the aircraft comprises a fixed wing aircraft.

17. The aircraft of claim 1, wherein the parallel propulsion unit is mounted on a centerline of the aircraft.

18. A method comprising:
controlling, by a controller, a power sharing module configured to mechanically control a ratio of mechanical energy derived from a gas turbine engine of a parallel propulsion unit:
used to drive a propulsor of the parallel propulsion unit that provides forward propulsion of an aircraft, and
used by an electrical machine of the parallel propulsion unit to generate electrical energy for output via one or more electrical busses of the aircraft, wherein a plurality of series propulsion units of the aircraft provide vertical propulsion to the aircraft using electrical energy received from the one or more electrical busses; and
selectively causing, by the controller, the power sharing module to cause all of the mechanical energy derived from the gas turbine engine to be used to generate electrical energy.

19. The method of claim 18, wherein selectively causing the power sharing module to cause all of the mechanical energy derived from the gas turbine engine to be used to generate electrical energy comprises:
causing, when the aircraft is performing a vertical takeoff or a hover, the power sharing module to cause all of the mechanical energy derived from the gas turbine engine to be used to generate electrical energy.

20. A method comprising:
controlling, by a controller, a power sharing module configured to mechanically control a ratio of mechanical energy derived from a gas turbine engine of a parallel propulsion unit:
used to drive a propulsor of the parallel propulsion unit that provides forward propulsion of an aircraft, and
used by an electrical machine of the parallel propulsion unit to generate electrical energy for output via one or more electrical busses of the aircraft, wherein a plurality of series propulsion units of the aircraft provide vertical propulsion to the aircraft using electrical energy received from the one or more electrical busses; and
selectively causing, by the controller, the power sharing module to cause all of the mechanical energy derived from the gas turbine engine to be used to drive the propulsor of the parallel propulsion unit.

* * * * *